United States Patent
Moriya (10) Patent No.: US 9,607,644 B2
(45) Date of Patent: Mar. 28, 2017

(54) PERPENDICULAR MAGNETIC RECORDING MEDIUM

(71) Applicant: FUJI ELECTRIC CO., LTD., Kawasaki-shi (JP)

(72) Inventor: Tomohiro Moriya, Sendai (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 40 days.

(21) Appl. No.: 14/488,267

(22) Filed: Sep. 16, 2014

(65) Prior Publication Data

US 2015/0004437 A1 Jan. 1, 2015

Related U.S. Application Data

(63) Continuation of application No. PCT/JP2013/006152, filed on Oct. 17, 2013.

(30) Foreign Application Priority Data

Dec. 6, 2012 (JP) ................................. 2012-267593

(51) Int. Cl.
*G11B 5/66* (2006.01)
*G11B 5/65* (2006.01)

(52) U.S. Cl.
CPC . *G11B 5/66* (2013.01); *G11B 5/65* (2013.01)

(58) Field of Classification Search
None
See application file for complete search history.

(56) References Cited

U.S. PATENT DOCUMENTS

| 5,652,054 A | 7/1997 | Kikitsu et al. |
| 6,068,739 A | 5/2000 | Suzuki et al. |

(Continued)

FOREIGN PATENT DOCUMENTS

| JP | H08-83418 A | 3/1996 |
| JP | 3010156 B2 | 2/2000 |

(Continued)

OTHER PUBLICATIONS

Yuki Inaba et al., "New High-Density Recording Technology: Energy-Assisted Recording Media", Fuji Electric Journal, vol. 83, No. 4, Jul. 10, 2010, p. 257-260.

(Continued)

*Primary Examiner* — Kevin Bernatz
(74) *Attorney, Agent, or Firm* — Rabin & Berdo, P.C.

(57) ABSTRACT

A magnetic recording medium having a thick magnetic recording layer of excellent magnetic characteristics is provided. The magnetic recording medium includes a non-magnetic substrate and a magnetic recording layer. The magnetic recording layer includes a plurality of first magnetic recording layers located at odd-numbered positions from the non-magnetic substrate, and one or more second magnetic recording layers located at even-numbered positions from the non-magnetic substrate. The first magnetic recording layers each have a granular structure that has first magnetic crystal grains with an ordered alloy and a first non-magnetic portion surrounding the first magnetic crystal grains and formed of a material having carbon as main component. The second magnetic recording layers each have a granular structure that has second magnetic crystal grains with an ordered alloy and a second non-magnetic portion surrounding the second magnetic crystal grains and formed of a material different from that of the first non-magnetic portion.

9 Claims, 2 Drawing Sheets

(56) References Cited

U.S. PATENT DOCUMENTS

| | | | |
|---|---|---|---|
| 6,641,934 B1 | 11/2003 | Suzuki et al. | |
| 8,530,065 B1* | 9/2013 | Chernyshov | G11B 5/65 |
| | | | 428/829 |
| 2001/0036564 A1 | 11/2001 | Ohmori | |
| 2003/0215675 A1 | 11/2003 | Inaba et al. | |
| 2004/0161638 A1 | 8/2004 | Maeda et al. | |
| 2006/0222902 A1* | 10/2006 | Mukai | G11B 5/66 |
| | | | 428/827 |
| 2010/0182714 A1 | 7/2010 | Kanbe et al. | |
| 2012/0052330 A1* | 3/2012 | Takekuma | G11B 5/84 |
| | | | 428/829 |
| 2012/0189872 A1 | 7/2012 | Umezawa et al. | |
| 2012/0225325 A1* | 9/2012 | Nemoto | G11B 5/65 |
| | | | 428/829 |
| 2014/0377590 A1* | 12/2014 | Uchida | G11B 5/65 |
| | | | 428/829 |
| 2015/0132608 A1* | 5/2015 | Kataoka | G11B 5/65 |
| | | | 428/829 |
| 2015/0138939 A1* | 5/2015 | Hellwig | G11B 5/66 |
| | | | 369/13.41 |

FOREIGN PATENT DOCUMENTS

| | | |
|---|---|---|
| JP | 2001-101645 A | 4/2001 |
| JP | 2001-291230 A | 10/2001 |
| JP | 3318204 B2 | 8/2002 |
| JP | 2004-178753 A | 6/2004 |
| JP | 2010-503139 A | 1/2010 |
| JP | 2010-129163 A | 6/2010 |
| JP | 2011-248934 A | 12/2011 |
| JP | 2012-048784 A | 3/2012 |
| JP | 2012-181902 A | 9/2012 |
| WO | WO-02/39433 A1 | 5/2002 |

OTHER PUBLICATIONS

Masukazu Igarashi et al., "Computer Simulation for Thermal Assist Recording", The Institute of electronics, Information and Communication Engineers, Technical Report of IEICE, MR2004-39 (Dec. 2004).

R. F. Penoyer, "Automatic Torque Balance for Magnetic Anisotropy Measurements", The Review of Scientific Instruments, vol. 30, No. 8, Aug. 1959, p. 711-714.

* cited by examiner

PERPENDICULAR MAGNETIC RECORDING MEDIUM

This non-provisional application is a continuation of and claims the benefit of the priority of Applicant's earlier filed International Application No. PCT/JP2013/006152 filed Oct. 17, 2013, the entire contents of which are incorporated herein by reference.

BACKGROUND OF THE INVENTION

1. Field of the Invention

The present invention relates to a perpendicular magnetic recording medium. More specifically, the present invention relates to a perpendicular magnetic recording medium for use in energy-assisted magnetic recording systems.

2. Description of the Prior Art

A perpendicular magnetic recording system is employed as the technology for increasing the magnetic recording density. A perpendicular magnetic recording medium includes at least a non-magnetic substrate and a magnetic recording layer formed of a hard magnetic material. The perpendicular magnetic recording medium may further optionally include a soft magnetic underlayer formed of a soft magnetic material and playing a role in concentrating the magnetic flux of a magnetic head onto the magnetic recording layer, an underlayer for orienting the hard magnetic material of the magnetic recording layer in a target direction, a protective film for protecting the surface of the magnetic recording layer, and the like.

Japanese Patent Application Publication No. 2001-291230 (Patent Document 1), Japanese Patent Application Publication H8-083418 (Patent Document 2, and WO 2002/039433 (Patent Document 3) each describe a granular magnetic material as the material for forming a magnetic recording layer of a perpendicular magnetic recording medium. The granular magnetic material contains magnetic crystal grains and a non-magnetic substance segregated to surround the magnetic crystal grains. Individual magnetic crystal grains within the granular magnetic material are magnetically separated by the non-magnetic substance.

For the purpose of further improving the recording densities of perpendicular magnetic recording media, in recent years there is an urgent need for reduction of the grain diameters of the magnetic crystal grains contained in the granular magnetic materials. Reducing the grain diameters of the magnetic crystal grains, however, leads to a decrease in thermal stability of the recorded magnetization (signals). In order to compensate for the decline in thermal stability resulting from the reduction of the grain diameters of the magnetic crystal grains, the magnetic crystal grains in the granular magnetic materials need to be formed using materials with high magnetocrystalline anisotropies.

One of the materials proposed as a material with high magnetocrystalline anisotropy is an $L1_0$ ordered alloy. Japanese Patent No. 3318204 (Patent Document 4), Japanese Patent No. 3010156 (Patent Document 5), Japanese Patent Application Publication No. 2001-101645 (Patent Document 6), Japanese Patent Application Publication No. 2004-178753 (Patent Document 7), and Japanese Translation of PCT Application No. 2010-503139 (Patent Document 8) each suggest, as the $L1_0$ ordered alloy, FePt, CoPt, FePd, CoPd, or the like, an alloy that contains at least one type of element selected from the group consisting of Fe, Co, and Ni, and at least one type of element selected from the group consisting of Pt, Pd, Au, and Ir. Patent Documents 4-8 documents also describe various methods for producing $L1_0$ ordered alloy thin films.

On the other hand, because the film thickness of a magnetic recording layer is basically uniform in an in-plane direction of the medium, reducing the grain diameter of the magnetic crystal grains thereof means reducing the cross-sectional area of the magnetic crystal grains of a certain height. Therefore, a diamagnetic field acting on the magnetic crystal grains themselves becomes small, whereas a magnetic field required to reverse the magnetization of the magnetic crystal grains (reversal magnetic field) becomes large. In view of the shape of the magnetic crystal grains, the improvement of the recording density implies that a larger magnetic field is required for recording signals.

Energy-assisted magnetic recording systems such as a heat-assisted recording system and a microwave-assisted recording system have been proposed by Inaba et al., "New High-density Recording Technology—Energy-assisted Magnetic Recording Media", Fuji Electric Journal, Fuji Electric Co., Ltd., Research (Non-patent Document 1) to improve the magnetic field strength required for signal recording. The heat-assisted recording system utilizes the temperature dependence of the magnetic anisotropy constant (Ku) of a magnetic material, which is a characteristic where the higher the temperature, the lower the Ku. This system uses a head that functions to heat a magnetic recording layer. In other words, this system executes writing while reducing a reversal magnetic field by increasing the temperature of the magnetic recording layer and temporarily reducing the Ku. The Ku returns to its original high value after the temperature of the magnetic recording layer drops, keeping the recorded signals (magnetization) stable. In the application of the heat-assisted recording system, a magnetic recording layer needs to be designed based on its temperature characteristics in addition to the conventional design guidelines.

According to a study by Igarashi et al., "Computer Simulation for Thermal Assist Recording—The Format of Technical Report", Technical Report of IEICE, MR2004-39, 2004 (Non-patent Document 2), the transition width between recording bits in the heat-assisted recording system is determined based on a head magnetic field gradient and a temperature gradient.

In addition, Japanese Patent Application Publication No. 2012-48784 (Patent Document 9) discloses a method for forming a magnetic recording layer of a granular magnetic material such as $L1_0$ ordered alloy by repeatedly executing the cycle of heating and depositing a substrate, the granular magnetic material containing magnetic crystal grains and a non-magnetic substance. Repeating the cycle of heating and depositing is said to not only prevent a decline in temperature of each substrate while the granular magnetic material is being deposited, but also to reduce the average grain diameter of the magnetic crystal grains and improve the perpendicular orientation. Patent Document 9 also discloses a magnetic recording layer in which two types of layers with different non-magnetic substances (a FePtAg-C layer and a FePtAg-$SiO_2$ layer) are stacked.

The inventor has discovered the need to increase the film thicknesses of magnetic recording layers in order to employ the energy-assisted magnetic recording systems. However, it was found out that when forming a magnetic recording layer using an ordered alloy granular magnetic material containing magnetic crystal grains and a non-magnetic substance, simply increasing the film thickness of the magnetic recording layer leads to degradation of the magnetic characteristics of the magnetic recording layer, such as the magnetic anisotropy constant (Ku) and the squareness ratio. For instance, in case of an ordered alloy granular magnetic material in which carbon (C) is used as a non-magnetic substance, the carbon, which is supposed to be present at grain boundaries of the magnetic crystal grains, covers the upper surface of the magnetic crystal grains to inhibit columnar growth of the magnetic crystal grains, which causes secondary growth of the magnetic crystal grains on the carbon in the upper surface, deteriorating the magnetic characteristics of the magnetic recording layer. When an oxide material is used as the non-magnetic substance, the magnetic characteristics decline as a result of increasing the film thickness of the magnetic recording layer.

The present invention was contrived in view of the foregoing problems, and an object thereof is to provide a magnetic recording medium that has a thick magnetic recording layer with excellent magnetic characteristics and a granular structure.

SUMMARY OF THE INVENTION

The magnetic recording medium of the present invention includes a non-magnetic substrate and a magnetic recording layer, wherein the magnetic recording layer includes a plurality of first magnetic recording layers located at odd-numbered positions from the non-magnetic substrate, and one or more second magnetic recording layers located at even-numbered positions from the non-magnetic substrate, the first magnetic recording layers each having a granular structure that has first magnetic crystal grains with an ordered alloy and a first non-magnetic portion surrounding the first magnetic crystal grains and formed of a material having carbon as the main component, and the second magnetic recording layer having a granular structure that has second magnetic crystal grains with an ordered alloy and a second non-magnetic portion surrounding the second magnetic crystal grains and formed of a material different from that of the first non-magnetic portion. Each of the plurality of first magnetic recording layers preferably has a film thickness of 1 to 4 nm. Each of the one or more second magnetic recording layers preferably has a film thickness of 1 to 3 nm. Each of the second non-magnetic portions may be composed of a material selected from the group consisting of silicon oxide and silicon nitride. Also, it is preferred that the first magnetic crystal grains and the second magnetic crystal grains be composed of the same element. The ordered alloys thereof may include at least one type of element selected from the group consisting of Fe, Co, and Ni, and at least one type of element selected from the group consisting of Pt, Pd, Au, and Ir. More preferably, each ordered alloy is selected from the group consisting of FePt, CoPt, FePd, and CoPd. Moreover, the magnetic recording medium of the present invention may further include, between the non-magnetic substrate and the magnetic recording layer, one or more layers selected from the group consisting of a heat sink layer, an adhesion layer, a soft magnetic underlayer, an underlayer, and a seed layer.

Adoption of this configuration can provide a magnetic recording medium that has a magnetic recording layer with a granular structure and a large magnetic anisotropy constant Ku in which the magnetic crystal grains can favorably be separated even when the thickness of the magnetic recording layer is increased. Owing to such characteristics, the magnetic recording medium of the present invention can favorably be used in the energy-assisted magnetic recording systems such as heat-assisted magnetic recording systems and microwave-assisted magnetic recording systems.

DETAILED DESCRIPTION OF THE INVENTION

The magnetic recording medium of the present invention includes a non-magnetic substrate and a magnetic recording layer, wherein the magnetic recording layer includes a plurality of first magnetic recording layers located at odd-numbered positions from the non-magnetic substrate, and one or more second magnetic recording layers located at even-numbered positions from the non-magnetic substrate. The first magnetic recording layers each have a granular structure that has first magnetic crystal grains and a first non-magnetic portion surrounding the first magnetic crystal grains and formed of a material having carbon as the main component. The second magnetic recording layers each have a granular structure that has second magnetic crystal grains and a second non-magnetic portion surrounding the second magnetic crystal grains and formed of a material different from that of the first non-magnetic portion.

Figure 1:
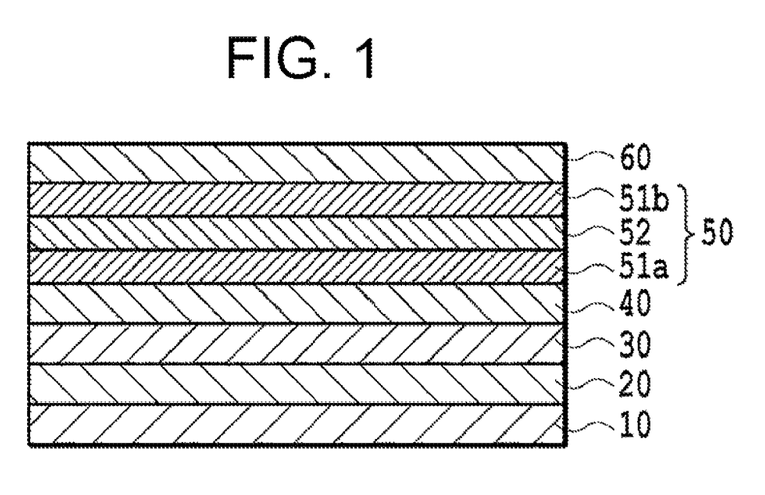
FIG. 1 is a cross-sectional diagram showing a configuration example of the magnetic recording medium of the present invention.
Figure 2:
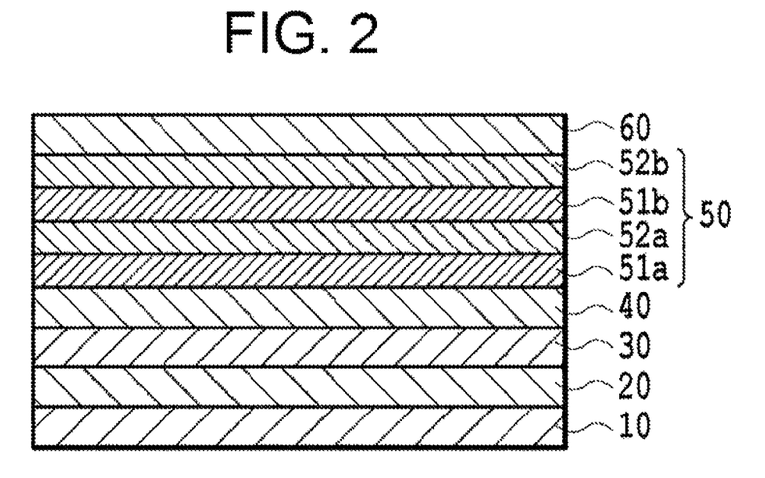
FIG. 2 is a cross-sectional diagram showing another configuration example of the magnetic recording medium of the present invention.

FIG. 1 shows a configuration example of the magnetic recording medium of the present invention that includes a magnetic recording layer 50 configured by two first magnetic recording layers 51a and 51b and one second magnetic recording layer 52. In this configuration example, the magnetic recording medium of the present invention has a non-magnetic substrate 10, an adhesion layer 20, an underlayer 30, a seed layer 40, the magnetic recording layer 50, and a protective layer 60. The adhesion layer 20, the underlayer 30, the seed layer 40, and the protective layer 60 illustrated in the configuration example in FIG. 1 may be provided optionally. The magnetic recording medium of the present invention may further include a heat sink layer, a soft magnetic underlayer, an intermediate layer and the like between the non-magnetic substrate 10 and the magnetic recording layer 50. As shown in FIG. 2, the magnetic recording medium of the present invention may include a magnetic recording layer 50 configured by two first magnetic recording layers 51a and 51b and two second magnetic recording layers 52a and 52b.

The non-magnetic substrate 10 may be in various forms having smooth surfaces. The non-magnetic substrate 10 can be formed using, for example, a material that is generally used in a magnetic recording medium (NiP-plated Al-alloy, tempered glass, crystallized glass, etc.).

The adhesion layer 20 that may be provided optionally is used for enhancing the adhesion between the layer formed thereon and the layer formed therebelow (including the non-magnetic substrate 10). In a case where the adhesion layer 20 is provided on the upper surface of the non-magnetic substrate 10, the adhesion layer 20 can be formed using a material that provides favorable adhesion to the aforementioned material of the non-magnetic substrate 10. Examples of the material include Ta and CrTi alloy. In a case where the adhesion layer 20 is formed between two constituent layers other than the non-magnetic substrate 10, the material used for forming the adhesion layer 20 include a metal such as Ni, W, Ta, Cr or Ru, or an alloy containing these metals. The adhesion layer 20 may have a single-layered structure or a stacked structure with a plurality of layers.

The soft magnetic underlayer (not shown) that may be provided optionally controls the magnetic flux generated from a magnetic head, to improve the read-write characteristics of the magnetic recording medium. The material used for forming the soft magnetic underlayer includes a crystalline material such as NiFe alloy, sendust (FeSiAl) alloy, or CoFe alloy, a microcrystalline material such as FeTaC, CoFeNi, or CoNiP, and an amorphous material including a Co alloy, such as CoZrNb or CoTaZr. The optimum film thickness of the soft magnetic underlayer depends on the structure and characteristics of the magnetic head used in magnetic recording. When forming the soft magnetic underlayer with other layers continuously, the soft magnetic underlayer is preferably formed into 10 nm to 500 nm (including either surface), with the productivity in mind.

When using the magnetic recording medium of the present invention in a heat-assisted magnetic recording system, the magnetic recording medium may be provided with a heat sink layer (not shown). The heat sink layer is used for effectively absorbing excess heat of the magnetic recording layer 50 that is generated during heat-assisted magnetic recording. The heat sink layer can be formed using a material of high thermal conductivity and specific heat capacity. Examples of such a material include a Cu simple substance, a Ag simple substance, a Au simple substance, or an alloy material composed mainly of these substances. The expression, "composed mainly of," means that the content of each material is 50 wt % or more. In consideration of its strength, the heat sink layer can be formed using an Al—Si alloy, a Cu—B alloy, or the like. The heat sink layer can also be formed using a sendust (FeSiAl) alloy, a soft magnetic CoFe alloy or the like, and the function of the soft magnetic underlayer (the function of concentrating a perpendicular magnetic field of the magnetic head onto the magnetic recording layer 50) can be applied to this heat sink layer. The optimum film thickness of the heat sink layer changes depending on the amount of heat and the heat distribution obtained during heat-assisted magnetic recording, as well as the layer configuration of the magnetic recording medium and the thickness of each constituent layer. When forming the heat sink layer with other constituent layers continuously, the heat sink layer is preferably formed into 10 nm or more but 100 nm or less, with the productivity in mind. The heat sink layer can be formed using a sputtering method (including a DC magnetron sputtering method), a vacuum deposition method, or any method known in the art. Normally the heat sink layer is formed using a sputtering method. In consideration of the characteristics required for the magnetic recording medium, the heat sink layer can be provided between the non-magnetic substrate 10 and the adhesion layer 20 or between the adhesion layer 20 and the underlayer 30.

The underlayer 30 is provided for the purpose of blocking the effect of the crystalline structure of the layer therebelow on the crystalline orientation and the size of the magnetic crystal grains in the magnetic recording layer 50. In case of providing a soft magnetic underlayer, then the underlayer 30 needs to be non-magnetic in order to prevent the magnetic impacts on the soft magnetic underlayer. Examples of the material used for forming the underlayer 30 include metals such as Cr and Ta, a NiW alloy, and Cr-based alloys such as CrTi, CrZr, CrTa, and CrW. The underlayer 30 can be formed using a sputtering method or any method known in the art.

The seed layer 40 functions to ensure adhesion between the magnetic recording layer 50 and a layer therebelow such as the underlayer 30, and to control the grain diameter and crystal orientations of the first magnetic crystal grains and the second magnetic crystal grains of the magnetic recording layer 50 which is the upper layer. It is preferred that the seed layer 40 be non-magnetic. In addition, in case of using the magnetic recording medium of the present invention in a heat-assisted magnetic recording system, the seed layer 40 preferably functions as a thermal barrier to control the temperature increase and distribution of the magnetic recording layer 50. In order to control the temperature increase and distribution of the magnetic recording layer 50, the seed layer 40 preferably functions both to rapidly increase the temperature of the magnetic recording layer 50 when heating up the magnetic recording layer 50 at the time of heat-assisted recording and to guide the heat of the magnetic recording layer 50 to the lower layers such as the underlayer 30 in a depth direction prior to transmission of heat in the in-plane direction of the magnetic recording layer 50.

In order to achieve these functions, the material of the seed layer 40 is selected appropriately in accordance with the material of the magnetic recording layer 50. More specifically, the material of the seed layer 40 is selected in accordance with the material of the magnetic crystal grains of the magnetic recording layer. For instance, when the magnetic crystal grains of the magnetic recording layer 50 are formed of an $L1_0$ ordered alloy, the seed layer 40 is preferably formed using an NaCl-type compound. More preferably, the seed layer 40 is formed using an oxide such as MgO or $SrTiO_3$ or a nitride such as TiN. The seed layer 40 can also be formed by stacking a plurality of layers formed of these materials. In terms of improving the crystallinity of the magnetic crystal grains and productivity of the magnetic recording layer 50, the seed layer 40 preferably has a film thickness of 1 nm to 60 nm, or more preferably 1 nm to 20 nm. The seed layer 40 can be formed using a sputtering method (including an RF magnetron sputtering method, a DC magnetron sputtering method, etc.), a vacuum deposition method, or any method known in the art.

The protective layer 60 can be formed using a material that is conventionally used in the field of magnetic recording media. Specifically, the protective layer 60 can be formed using a carbon-based material such as diamond-like carbon or a silicon-based material such as silicon nitride. The protective layer 60 may have a single-layered structure or a stacked structure. The stacked structure of the protective layer 60 may be, for example, a structure with two types of carbon-based materials having mutually different characteristics, a structure with a metal and a carbon-based material, or a structure with a metal oxide film and a carbon-based material. The protective layer 60 can be formed using a sputtering method (including a DC magnetron sputtering method), a vacuum deposition method, or any method known in the art.

The magnetic recording medium of the present invention may further optionally include a liquid lubricant layer (not shown) provided on the protective layer 60. The liquid lubricant layer can be formed using a material that is conventionally used in the field of magnetic recording media (e.g., a perfluoropolyether-based lubricant). The liquid lubricant layer can be formed using a coating method such as a dip-coating method or a spin-coating method.

The magnetic recording layer 50 has a structure in which the plurality of first magnetic recording layers 51 and one or more second magnetic recording layers 52 are alternately stacked on one another. The magnetic recording layer 50 configured with the minimum number of layers has two of the first magnetic recording layers 51 (a, b) and a second magnetic recording layer 52 therebetween, as shown in FIG. 1. The number of the first magnetic recording layers 51 and the number of the second magnetic recording layers 52 configuring the magnetic recording layer 50 can be determined based on the desired film thickness of the magnetic recording layer 50. In a case where the magnetic recording layer 50 is desired to be thick, the magnetic recording layer 50 may be configured by alternately stacking two of the first magnetic recording layers 51 (a, b) and two of the second magnetic recording layers 52 (a, b) on one another, as shown in FIG. 2. Given that the first magnetic recording layers 51 and the second magnetic recording layers 52 are alternately stacked on one another, the magnetic recording layer 50 can be formed using five or more of the constituent layers. The number of the constituent layers configuring the magnetic recording layer 50 may be an odd number or an even number.

The first magnetic recording layers 51 are each an odd-numbered constituent layer counted from the non-magnetic substrate in the magnetic recording layer 50. The first magnetic recording layers 51 each have a granular structure having first magnetic crystal grains and a first non-magnetic portion surrounding the first magnetic crystal grains. The first magnetic crystal grains are configured using an ordered alloy. Even if the ordered alloy contain a small amount of crystal defects or a small amount of impurities, such ordered alloy can be used as long as the characteristics thereof are exerted in the first magnetic crystal grains. It is preferred that the first magnetic crystal grains be formed using an $L1_0$ ordered alloy. The $L1_0$ ordered alloy that can be used is FePt, CoPt, FePd, CoPd, or the like, an alloy that contains at least one type of element selected from the group consisting of Fe, Co, and Ni, and at least one type of element selected from the group consisting of Pt, Pd, Au, and Ir. Other metals such as Ag, Cu and Mn may be added to the $L1_0$ ordered alloy for the purpose of lowering the temperature required to order the ordered alloy, increasing the temperature gradient of coercivity, and adjusting the ferromagnetic resonance frequency with respect to a microwave.

The first non-magnetic portion is formed from a material having carbon as the main component. The first non-magnetic portion is preferably formed of carbon. An example of configuring the first non-magnetic portion with carbon is now described hereinafter, for the purpose of facilitating understanding. However, a material containing carbon as the main component could bring about the same discussion as the one below. The volume ratios of the carbon in the plurality of first magnetic recording layers may be equal to or different from one another. The greater the film thickness of the magnetic recording layer 50, the easier for the carbon to be deposited on the upper surface of the first magnetic crystal grains other than on the first non-magnetic portion, inducing the aforementioned secondary growth. Excess carbon is preferably controlled in order to inhibit the deposition of carbon onto the upper surface of the first magnetic crystal grains. Therefore, it is preferred that the volume ratio of the carbon in the upper positioned layer of first magnetic recording layer be reduced. More specifically, it is preferred that the volume ratio of the carbon in the second first magnetic recording layer 51b be lower than the volume ratio of the carbon in the bottom first magnetic recording layer 51a. The same is true when stacking an additional first magnetic recording layer, and the volume ratio of the carbon in the third first magnetic recording layer is preferably lower than that of the bottom first magnetic recording layer 51a.

The grain diameter of the magnetic crystal grains is determined based on the volume ratio of the first non-magnetic portion of the first magnetic recording layer 51a disposed immediately above the seed layer 40. The grain diameter of the magnetic crystal grains is preferably 5 to 12 nm. Thus, the first non-magnetic portion of the bottom first magnetic recording layer 51a is preferably 20 to 50 vol % of the entire bottom first magnetic recording layer 51a. The volume ratios of the first non-magnetic portions in the second first magnetic recording layer 51b and thereafter are preferably 10 to 50 vol %. This is because the volume ratios of the first non-magnetic portions of the second first magnetic recording layer and thereafter are preferably lower than the volume ratios of the first non-magnetic portions of the bottom first magnetic layer 51a as described above, although in some cases the volume ratio may be equal to the bottom first magnetic recording layer 51a.

The film thickness of each first magnetic recording layer 51 is set according to the ratio of the corresponding first non-magnetic portion. Generally each first magnetic recording layer 51 has a film thickness of 1 to 4 nm. The film thickness within this range can enhance favorable separation between the first magnetic crystal grains and the first non-magnetic portion, while preventing secondary growth of the first magnetic crystal grains. Favorable separation between the first magnetic crystal grains and the first non-magnetic portion can set the α of a hysteresis loop at a favorable value of approximately 1 to maintain the squareness ratio. The term "α of a hysteresis loop" is the slope of a magnetization curve (dM/dH) in the vicinity of coercivity (H=Hc). When the magnetic crystal grains in the granular structure are not magnetically separated well, the value of the α increases. When, for example, the magnetic characteristics of the magnetic crystal grains are irregular due to the presence of crystal grains generated as a result of secondary growth of the magnetic crystal grains, the value of the α drops. It is preferred that the value of the α be approximately 1. The term "squareness ratio" means the ratio of residual magnetization (Mr) to saturation magnetization (Ms) (Mr/Ms). The squareness ratio is preferably a value of approximately 1. In addition, the term "secondary growth of the first magnetic crystal grains" is a phenomenon where the upper surfaces of the first magnetic crystal grains growing from the seed layer surface would be covered by the material of the first non-magnetic portion, then, magnetic crystal grains in random orientations grow on thereof. Secondary growth of the first magnetic crystal grains causes an unwanted phenomenon where the magnetic anisotropy of the entire layer decreases due to the irregularity in the orientations of the magnetic crystal grains.

The second magnetic recording layer 52 is an even-numbered constituent layer counted from the non-magnetic substrate in the magnetic recording layer 50. The second magnetic recording layer 52 has a granular structure having second magnetic crystal grains and a second non-magnetic portion surrounding the second magnetic crystal grains. As with the first magnetic crystal grains, the second magnetic crystal grains are configured using an ordered alloy. Even if the ordered alloy contain a small amount of crystal defects or a small amount of impurities, such ordered alloy can be used as long as the characteristics thereof are exerted in the second magnetic crystal grains. It is preferred that the second magnetic crystal grains be formed using an $L1_0$ ordered alloy. The second non-magnetic portion, on the other hand, is formed of a material different from that of the first non-magnetic portion. The material used for forming the second non-magnetic portion is selected from the group consisting of silicon oxide (SiOx) and silicon nitride (SiNx). These materials have low thermal conductivities and are effective even in preventing transmission of heat in undesirable in-plane directions during heat-assisted recording. The inventor has discovered that these materials do not enter the upper surface of the magnetic crystal grains as easily as a carbon-based material of the first non-magnetic portion does. Especially the silicon oxide is also effective in preventing the diffusion of the carbon-based material into the upper surface. The second non-magnetic portion of the second magnetic recording layer 52 is preferably 25 to 50 vol % of the entire second magnetic recording layer 52.

The film thickness of the second magnetic recording layer 52 is set according to the ratio of the second non-magnetic portion. Generally the second magnetic recording layer 52 has a film thickness of 1 to 3 nm. The film thickness within this range can prevent reduction in the squareness ratio and magnetic anisotropy constant Ku of the entire magnetic recording layer 50. The reasons are as follows. The precipitation of the silicon oxide and the silicon nitride onto the second non-magnetic portion is facilitated during the initial stage in which the second magnetic recording layer 52 is formed on a first magnetic recording layer 51. As a result, the $L1_0$-ordering of the second magnetic crystal grains cannot easily be inhibited, achieving favorable magnetic characteristics. However, the second magnetic recording layer 52 with a film thickness of greater than 3 nm prevents the precipitation of the silicon oxide and the silicon nitride onto the second non-magnetic portion, preventing ordering of the second magnetic crystal grains and deteriorating the magnetic characteristics.

Deterioration of the magnetic characteristics can be improved as follows. After forming the second magnetic recording layer 52 into a film thickness of 3 nm or less, each first magnetic recording layer 51 is formed again into a film thickness of 1 to 4 nm. This can allow the precipitation of the silicon oxide and the silicon nitride onto the second non-magnetic portion. As a result, the $L1_0$-ordering of the second magnetic crystal grains cannot easily be inhibited, achieving favorable magnetic characteristics. The desired film thickness of the entire magnetic recording layer 50 can be obtained by repeatedly forming the second magnetic recording layer 52 and the first magnetic recording layers 51, if desired.

It is preferred that the first magnetic crystal grains and the second magnetic crystal grains be of the same constituent element, so that the epitaxial growth from the first magnetic crystal grains to the second magnetic crystal grains is facilitated, improving the degree of order of the ordered alloy.

In order to form the magnetic recording layer 50 of the present invention, the first magnetic recording layer 51a is formed first. It is preferred that the first magnetic recording layer 51 be formed by a sputtering method that involves heating the substrate. As described above, the second magnetic recording layer 52 is formed on the first magnetic recording layer 51 having a film thickness of 1 to 4 nm. It is preferred that the second magnetic recording layer 52 be formed by a sputtering method that involves heating the substrate, as with the first magnetic recording layer 51, except that the target used is different. In so doing, the second magnetic crystal grains of the second magnetic recording layer 52 are formed on the first magnetic crystal grains of the first magnetic recording layer 51a. The second magnetic recording layer 52 here is formed into a film thickness of 1 to 3 nm, as described above. In addition, the first magnetic recording layer 51b is formed on the second magnetic recording layer 52 in the same manner, completing the magnetic recording layer 50 of the present invention. The first magnetic recording layer 51b, the second first magnetic recording layer, is formed into a thickness of 1 to 4 nm, or more preferably 1 to 3 nm. In so doing, the first magnetic crystal grains of the first magnetic recording layer 51b are formed on the second magnetic crystal grains of the second magnetic recording layer 52.

If desired, the formation of the second magnetic recording layer 52 on the first magnetic recording layer 51 and the formation of the first magnetic recording layer 51 on the second magnetic recording layer 52 are alternately repeated, to form the magnetic recording layer 50 into a desired thickness.

Through the use of the foregoing configuration, the magnetic crystal grains of the first magnetic recording layers and the magnetic crystal grains of the second magnetic recording layer grow in a columnar shape on a one-to-one basis. In other words, the magnetic crystal grains of the second magnetic recording layer carry over the magnetic crystal grains of the first magnetic recording layer into crystal growth, and then the magnetic crystal grains of the first magnetic recording layer carry over the magnetic crystal grains of the second magnetic recording layer therebelow into crystal growth. Preventing secondary growth of the magnetic crystal grains in this manner can obtain a magnetic recording medium that has a magnetic recording layer having not only the desired squareness ratio and magnetic anisotropy constant but also large thickness.

EXAMPLES

Example 1

A chemically strengthened glass substrate (N-10 glass substrate, manufactured by HOYA Group) with smooth surfaces was washed, to prepare a non-magnetic substrate 10. The non-magnetic substrate 10 was washed and then introduced into a sputtering apparatus. A Ta adhesion layer 20 of a film thickness of 5 nm was formed by a DC magnetron sputtering method using a Ta target in Ar gas at 0.3 Pa.

Next, a Cr underlayer 30 of a film thickness of 20 nm was formed by a DC magnetron sputtering method using a pure Cr target in Ar gas at 0.3 Pa.

Subsequently, a substrate was heated at 300° C., and a MgO seed layer 40 of a film thickness of 5 nm was formed by an RF sputtering method using a MgO target in Ar gas at 0.02 Pa. The RF power applied was 200 W.

The stacked product in which the seed layer 40 was formed was heated at 450° C., and a FePt-C first magnetic recording layer 51a of a film thickness of 2 nm was formed by a DC magnetron sputtering method using $Fe_{50}Pt_{50}$-C in Ar gas at 1.0 Pa. In so doing, the composition of the $Fe_{50}Pt_{50}$-C target was adjusted in such a manner that the composition of the first magnetic recording layer 51a to be obtained would be 60 vol % $Fe_{50}Pt_{50}$-40 vol % C.

Thereafter, the resultant stacked product in which the first magnetic recording layer 51a was formed was heated again at 450° C., and a FePt-$SiO_2$ second magnetic recording layer 52 of a film thickness of 2 nm was formed by a DC magnetron sputtering method using $Fe_{50}Pt_{50}$-$SiO_2$ in Ar gas at 1.0 Pa. In so doing, the composition of the $Fe_{50}Pt_{50}$-$SiO_2$ target was adjusted in such a manner that the composition of the second magnetic recording layer 52 to be obtained would be 75 vol % $Fe_{50}Pt_{50}$-25 vol % $SiO_2$.

Thereafter, the resultant stacked product in which the second magnetic recording layer 52 was formed was heated again at 450° C., and a FePt-C first magnetic recording layer 51b of a film thickness of 2 nm was formed by a DC magnetron sputtering method using $Fe_{50}Pt_{50}$-C in Ar gas at 1.0 Pa. In so doing, the composition of the $Fe_{50}Pt_{50}$-C target was adjusted in such a manner that the composition of the first magnetic recording layer 51b to be obtained would be 75 vol % $Fe_{50}Pt_{50}$-25 vol % C.

Next, a carbon protective layer 60 of a film thickness of 2 nm was formed by a DC magnetron sputtering method using a carbon target in Ar gas at 0.3 Pa, completing a magnetic recording medium.

Comparative Example 1

A magnetic recording medium was obtained through the same procedure as Example 1, except that the first magnetic recording layer 51b, the third layer of the magnetic recording layer 50, was not formed, and that the film thickness of the second magnetic recording layer 52 was changed to 3 nm.

Comparative Example 2

A magnetic recording medium was obtained through the same procedure as Example 1, except that the first magnetic recording layer 51b, the third layer of the magnetic recording layer 50, was not formed, and that the composition of the second magnetic recording layer 52 was changed to 65 vol % $Fe_{50}Pt_{50}$-35 vol % $SiO_2$. In this case, the film thickness of the second magnetic recording layer 52 was changed to 3 nm, 5 nm, and 7 nm.

Comparative Example 3

A magnetic recording medium was obtained through the same procedure as Example 1, except that the second magnetic recording layer 52 and the first magnetic recording layer 51b, which were the second layer and the third layer of the magnetic recording layer 50, were not formed, and that the composition of the first magnetic recording layer 51a was changed to 75 vol % $Fe_{50}Pt_{50}$-25 vol % C. In this case, the film thickness of the first magnetic recording layer 51a was changed to 4 nm and 6 nm.

Figure 3:
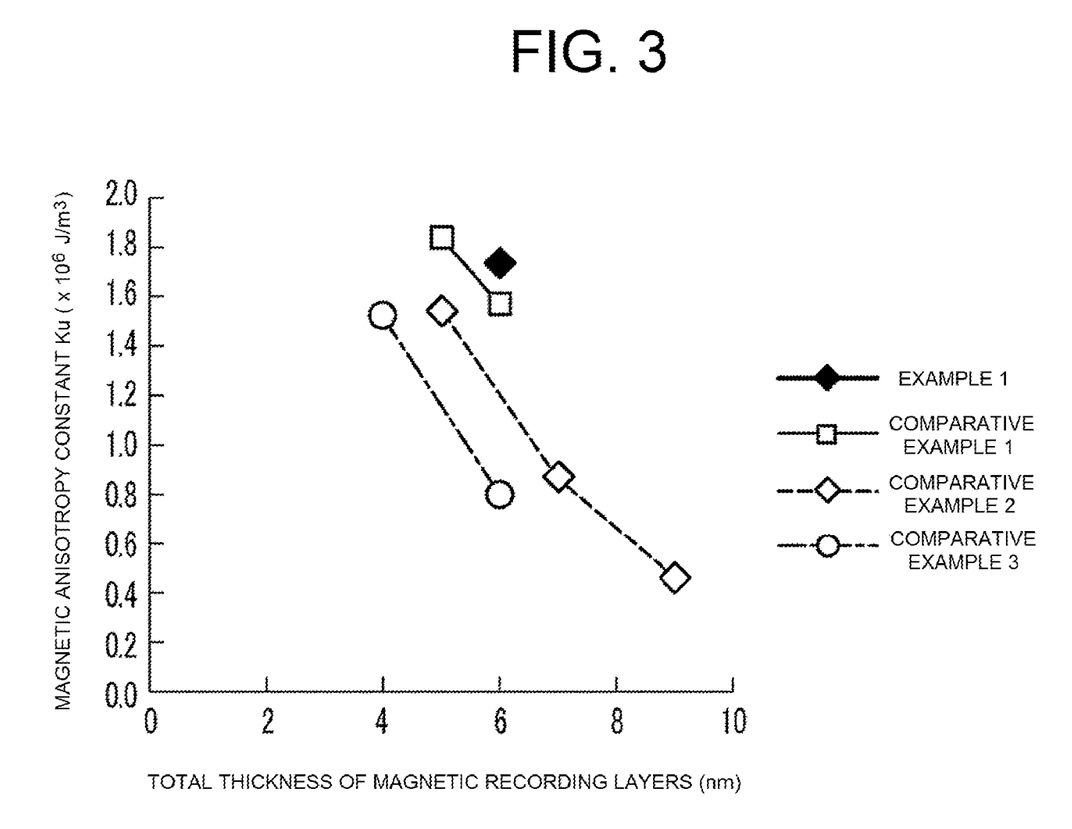
FIG. 3 is a graph showing the relationships between the film thicknesses and the magnetic anisotropy constants of magnetic recording layers of magnetic recording media obtained in Example and Comparative Examples.

Evaluations:

The magnetic anisotropy constants Ku, the squareness ratios, the α values, and the coercivities Hc of the magnetic recording layers in the magnetic recording media of Example and Comparative Examples were measured. The magnetic anisotropy constants Ku were calculated based on the publications R. F. Penoyer. *Automatic Torque Balance for Magnetic Anisotropy Measurements*. The Review of Scientific Instruments: August 1959. Vol. 30-No. 8, 711-714 (Non-patent Document 3) and Chikazumi, Soshin. *Physics of Ferromagnetism—Vol.* 2. Shokabo: 10-21 (Non-patent Document 4) by evaluating, with use of a PPMS apparatus (Physical Property Measurement System, manufactured by Quantum Design, Inc.), the dependence of spontaneous magnetization on the angle at which the magnetic field is applied. The squareness ratios, the coercivities Hc, and the α values were obtained by measuring the M-H hysteresis loops using the PPMS apparatus. The results are shown in Table 1. Note that the characteristic values of the sample of Comparative Example 1 that has a 4-nm second layer are the estimates obtained through simulation. Additionally, the relationships between the total film thickness and the magnetic anisotropy constants Ku of the magnetic recording layers of the magnetic recording media obtained in Example and Comparative Examples are shown in FIG. 3.

TABLE 1

Configurations and evaluations of magnetic recording media.

|  |  | Example 1 | Comparative Example 1 |  | Comparative Example 2 |  |  | Comparative Example 3 |  |
|---|---|---|---|---|---|---|---|---|---|
| First layer | Material | 60% FePt—40% C | 60% FePt—40% C |  | 60% FePt—40% C |  |  | 75% FePt—25% C |  |
|  | Film thickness (nm) | 2 | 2 |  | 2 |  |  | 4 | 6 |
| Second layer | Material | 75% FePt—25% $SiO_2$ | 75% FePt—25% $SiO_2$ |  | 65% FePt—35% $SiO_2$ |  |  | — | — |
|  | Film thickness (nm) | 2 | 3 | 4 | 3 | 5 | 7 | — | — |
| Third layer | Material | 75% FePt—25% C | — |  | — |  |  | — |  |
|  | Film thickness (nm) | 2 | — |  | — |  |  | — |  |
| Total film thickness (nm) |  | 6 | 5 | 6 | 5 | 7 | 9 | 4 | 6 |
| Magnetic anisotropy constant Ku (×$10^6$ J/$m^3$) |  | 1.73 | 1.84 | 1.57 | 1.54 | 0.87 | 0.46 | 1.55 | 0.81 |
| Squareness ratio |  | 0.93 | 0.96 | 0.85 | 0.95 | 0.68 | 0.55 | 0.95 | 0.86 |
| α |  | 0.85 | 1.01 | 0.95 | 0.81 | 0.64 | 0.50 | 0.93 | 0.70 |
| Coercivity (kOe) |  | 18.81 | 19.1 | — | 19.07 | 12.04 | 7.61 | 17.44 | 20.22 |
| (×$10^6$ A/m) |  | 1.50 | 1.52 | — | 1.52 | 0.96 | 0.61 | 1.39 | 1.61 |

As is clear from the comparison between the samples of Comparative Example 3, the magnetic anisotropy constant Ku and the α value of the magnetic recording layer configured by a single FePt-C layer, dropped drastically as the film thickness increased. The decline in the magnetic anisotropy constant Ku is considered to be due to secondary growth of FePt on a layer that was formed when the carbon (C) entered the upper surface of the FePt magnetic crystal grains as the film thickness increased. The decline of the α value is considered to be incurred because the magnetic separation between the magnetic crystal grains became inadequate as the film thickness increased.

According to the comparison among the samples of Comparative Example 2 and the comparison between Comparative Example 2 and Comparative Example 3, the two magnetic recording layers in which the second layer of FePt-$SiO_2$ is formed on the first layer of FePt-C have a greater magnetic anisotropy constant Ku than the single layer of FePt-C. However, the magnetic anisotropies of the two magnetic recording layers decrease as the film thickness of the second FePt-$SiO_2$ layer increases. It is not intended to be bound by any theories but this result is considered to be due to the fact that the amount of $SiO_2$ present in the FePt magnetic crystal grains increases as the film thickness increases. Moreover, because the α values and the squareness ratios decrease as the film thickness increases, the increase in the film thickness clearly impairs the magnetic separation between the magnetic crystal grains. According to the comparison between Comparative Example 1 and Comparative Example 2, increasing the magnetic anisotropy constant Ku by changing the composition of the second layer is considered doable.

On the other hand, according to the comparison among the magnetic recording media having a total magnetic recording layer film thickness of 6 nm, the magnetic recording medium of Example 1 according to the present invention shows a greater magnetic anisotropy constant Ku than those of the comparative examples. It is clear from this result that alternately stacking the first magnetic recording layers having the first non-magnetic portions formed of carbon and the second magnetic recording layer having the second non-magnetic portion formed of $SiO_2$ to form a three-layer structure and setting the film thicknesses of the first and second magnetic recording layers at a predetermined value or less, can prevent the adverse effects that the increase in film thickness of each layer has on the magnetic anisotropy constants Ku. In addition, the α value and the squareness ratio of the magnetic recording medium of Example 1 each show a value approximately 1, indicating that favorable magnetic separation is performed successfully between the magnetic crystal grains in the magnetic recording layers of this medium.

It is understood that various other modifications will be apparent to and can be readily made by those skilled in the art without departing from the scope and spirit of the present invention. Accordingly, it is not intended that the scope of the claims appended hereto be limited to the description set forth above but rather that the claims be construed as encompassing all of the features of patentable novelty which reside in the present invention, including all features which would be treated as equivalents thereof by those skilled in the art to which the invention pertains.

What is claimed is:

1. A perpendicular magnetic recording medium, comprising:
    a non-magnetic substrate; and
    a magnetic recording layer that consists of an odd number of layers which is equal to or greater than three and that is comprised of:
        a plurality of first magnetic recording layers located at odd-numbered positions from the non-magnetic substrate and each first magnetic recording layer of the plurality of first recording layers having a granular structure that has first magnetic crystal grains with an ordered alloy and a first non-magnetic portion surrounding the first magnetic crystal grains and formed of a material having carbon as the main component; and
        one or more second magnetic recording layers located at even-numbered positions from the non-magnetic substrate, each second magnetic recording layer of the one or more second magnetic recording layers having a granular structure that has second magnetic crystal grains with an ordered alloy and a second non-magnetic portion surrounding the second magnetic crystal grains and formed of a material different from that of the first non-magnetic portion.

2. The perpendicular magnetic recording medium according to claim 1, wherein each of the plurality of first magnetic recording layers has a film thickness of 1 to 4 nm, and each of the one or more second magnetic recording layers has a film thickness of 1 to 3 nm.

3. The perpendicular magnetic recording medium according to claim 1, wherein the second non-magnetic portion is composed of a material selected from the group consisting of silicon oxide and silicon nitride.

4. The perpendicular magnetic recording medium according to claim 1, wherein the first magnetic crystal grains and the second magnetic crystal grains are composed of the same element.

5. The perpendicular magnetic recording medium according to claim 4, wherein the ordered alloy includes at least one type of element selected from the group consisting of Fe, Co, and Ni, and at least one type of element selected from the group consisting of Pt, Pd, Au, and Ir.

6. The perpendicular magnetic recording medium according to claim 5, wherein the ordered alloy is selected from the group consisting of FePt, CoPt, FePd, and CoPd.

7. The perpendicular magnetic recording medium according to claim 1, further comprising, between the non-magnetic substrate and the magnetic recording layer, one or more layers selected from the group consisting of a heat sink layer, an adhesion layer, a soft magnetic underlayer, an underlayer, and a seed layer.

8. The perpendicular magnetic recording medium according to claim 1, wherein the ordered alloy includes at least one type of element selected from the group consisting of Fe, Co, and Ni, and at least one type of element selected from the group consisting of Pt, Pd, Au, and Ir.

9. The perpendicular magnetic recording medium according to claim 8, wherein the ordered alloy is selected from the group consisting of FePt, CoPt, FePd, and CoPd.

* * * * *